Sept. 13, 1955 H. E. BESTE 2,717,959

AUTOMATIC FREQUENCY CONTROL CIRCUIT

Filed Feb. 28, 1950 2 Sheets-Sheet 1

INVENTOR.
HAROLD E. BESTE
BY
Darby & Darby
ATTORNEYS

AUTOMATIC FREQUENCY CONTROL CIRCUIT

Filed Feb. 28, 1950 2 Sheets-Sheet 2

INVENTOR.
HAROLD E. BESTE
BY
Darby & Darby
ATTORNEYS

United States Patent Office 2,717,959

Patented Sept. 13, 1955

2,717,959

AUTOMATIC FREQUENCY CONTROL CIRCUIT

Harold E. Beste, Verona, N. J., assignor to Allen B. Du Mont Laboratories, Inc., Passaic, N. J., a corporation of Delaware Application February 28, 1950, Serial No. 146,720

6 Claims. (Cl. 250—36)

My invention relates to television receivers and particularly to circuits for maintaining the scanning of a received picture in synchronism with transmitted scanning signals.

In one known type of synchronization circuit, which is a form of automatic frequency control, a deflection oscillator in the receiver is adjusted to oscillate at a frequency approximately that at which it is desired to scan the received picture. The oscillator is also provided with a frequency control by means of which the frequency of the local oscillator can be varied above and below the desired frequency in response to a controlling voltage. A signal from the oscillator is introduced into a phase comparator circuit where it is compared to a synchronizing signal from the television transmitter. From the phase-comparator circuit a control voltage is derived, the magnitude of this voltage being dependent upon the relative phase between the deflection oscillator signal and the incoming synchronizing signal. The control voltage is then applied to the frequency control of the deflection oscillator, causing the latter to be locked in synchronism with the incoming synchronizing signal.

While this type of scanning has many advantages when used to generate horizontal scanning signals in television receivers, it has been found that vertical synchronizing signals often affect these circuits adversely, producing phase changes in the horizontal oscillator. This causes the top portions of the received picture to be displaced laterally, causing a "hook" in the picture, which hook in turn twists and distorts the received pictures, and detracts from the enjoyment thereof.

It is an object of this invention to provide an improvement upon this type of synchronization circuit to eliminate the "hook" in the picture.

In accordance with the invention, a high-pass filter or differentiating circuit is introduced between the final synchronization signal amplifier and the automatic frequency control circuit, eliminating lower frequency components in, and shaping the wave so that the hook or bend in the picture is eliminated.

Figure 1:
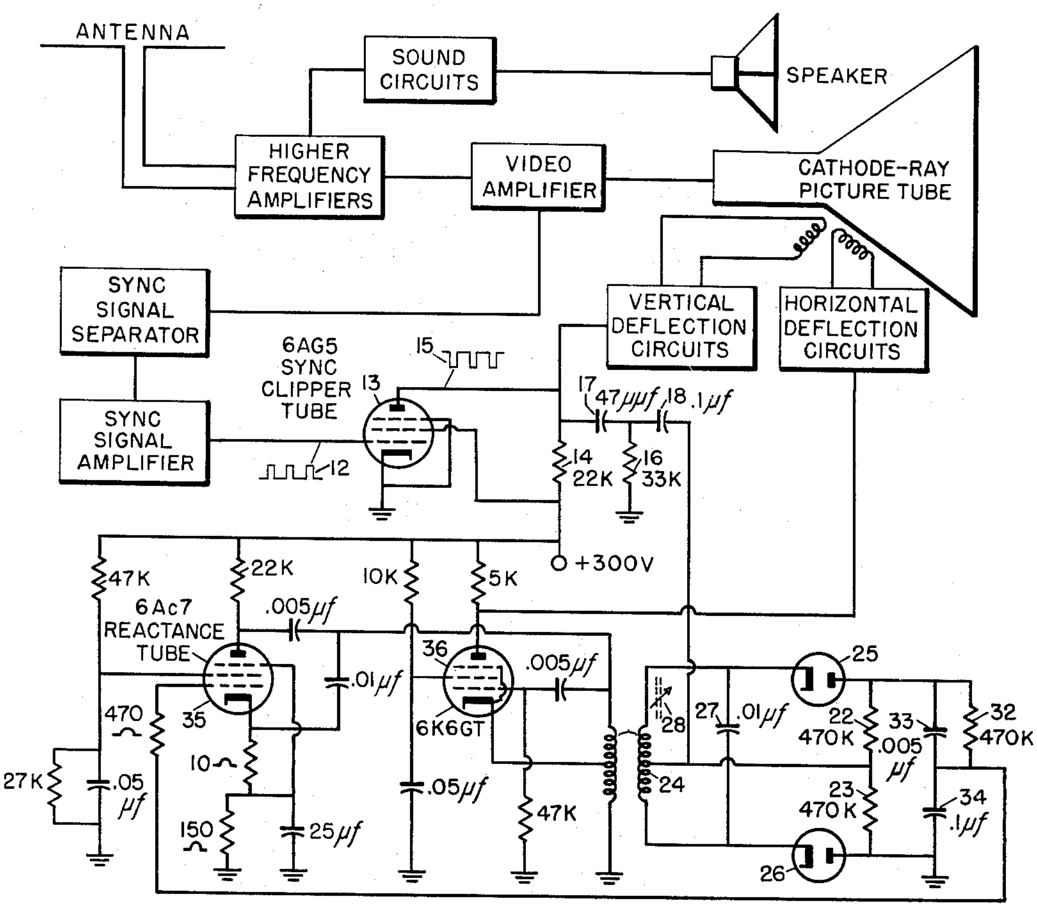
Figure 1 shows in partial block-and-schematic form a television receiver embodying the invention.

In Figure 1 the usual television receiver circuits shown in block form provide synchronizing signals from which the video signals have been clipped. These synchronizing signals identified at 12, are introduced into the grid of an amplifier tube 13. The plate of the tube 13 is connected to a source of positive potential through a load resistor 14. Plate current of the tube 13 flowing through the load resistor 14 produces negatively polarized synchronization signals 15. The plate also is connected to a resistor 16 through a capacitor 17, these circuit elements, together with load resistor 14, forming a differentiating circuit having a time constant of approximately 2 microseconds.

The resistor 16 is connected through a capacitor 18 to the junction of two resistors 22 and 23 and also to the center tap of the secondary winding 24 of a transformer. The extremities of this winding 24 are connected respectively to the cathodes of phase-detector diodes 25 and 26. A capacitor 27 is connected across this winding 24, forming a tuned circuit tunable by means of an adjustable slug 28 associated with the winding.

The resistors 22 and 23 are connected respectively to the anodes of the phase detector diodes 25 and 26, the latter anode being grounded. The anode of the diode 25 is connected through the parallel combination of a resistor 32 and a capacitor 33 to a capacitor 34, these latter elements forming an integrating or delay network, integrating the voltage applied to a reactance tube 35 controlling a horizontal deflection oscillator 36.

Figure 2:
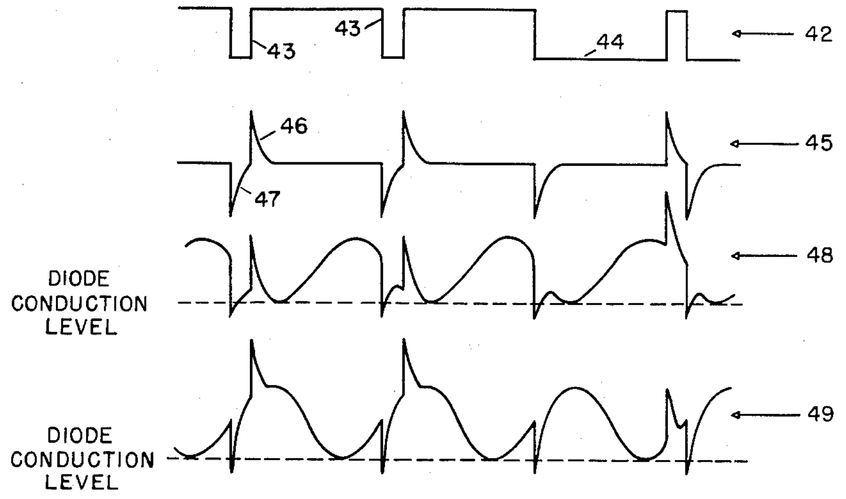
Figures 2 and 3 show wave forms illustrating the operation.

The operation of the circuit may be seen by referring to the voltage wave forms of Figure 2 in conjunction with the circuit of Figure 1. The negative synchronizing pulses 15 of Figure 1 are in part reproduced as the wave 42 of Figure 2, the horizontal synchronizing pulses 43 being short, and the vertical synchronizing pulses 44 being long. The wave 42 is then differentiated by the differentiation network 14, 16, 17 forming the wave 45. The 2 microsecond time constant is chosen to be short enough that the positive pulses 46 and the negative pulses 47 are approximately equal, but not shorter than necessary, to avoid loss of efficiency. The differentiating circuit allows the synchronizing frequencies above 500 kc. to pass through, and attenuates progressively the lower frequencies. The network thus may be considered to be one form of a high-pass filter. A sinusoidal voltage generated in the local oscillator 36 is coupled to the secondary 24 of the transformer, and is added in opposite polarities to the voltage 45, producing the voltage 48 at the cathode of the diode 25 and the voltage 49 at the cathode of the diode 26.

The negative peaks of the voltages 48 and 49 cause conduction of their respective diodes at the levels indicated. Since the plate of the diode 26 is connected to ground, a positive voltage will be generated at its cathode when the diode conducts. The diode 25 generates at its plate a voltage negative with respect to its cathode. Since the cathodes of the two diodes are at the same direct potential, the voltages generated by the two diodes will tend to oppose one another, so that the voltage at the plate of the diode 25 will be negative if the diode 25 conducts more current, and positive if the diode 26 conducts more current.

If the local oscillator for some reason starts to run too fast, the negative peaks of the wave 48 will increase in amplitude due to the advancing phase of the sinusoidal component. Simultaneously, the negative peaks of the wave 49 will be decreased. As a result, the diode 25 will be more conductive than the diode 26, producing a negative voltage at the plate of the latter.

The negative voltage thus generated is delayed by the integrating network 32, 33, 34 to stabilize the control action, and is then applied to the frequency controlling reactance 35. This latter may be any of the commonly known types polarized in such a way that a more positive voltage causes an increase in frequency of the controlled oscillator and vice versa. In the case being described, having the plate of the reactance tube capacitively coupled to the cathode, a negative voltage applied, decreases the frequency of the oscillator, thus correcting the error in frequency which originally occurred.

It will be noted by referring to Figure 1 that the output impedance of the differentiating circuit comprising condenser 17 and resistor 16 is approximately equal to the impedance of resistor 16 alone which in the present embodiment is given as 33,000 ohms. This impedance is very much lower than the impedance of resistors 22 and 23 in the discriminator circuit, and although the impedance magnitudes shown in the drawings are not to be considered as limiting, it has been found that the circut of Figure 1 operates very much better if the output impedance of the differentiating circuit is low in comparison to the impedance of the resistors 22 and 23.

The reason for this is believed to be that when this condition is achieved the output impedance of the differentiating circuit is also relatively low with respect to the impedance offered by stray capacitance between the two sections of inductance 24 and ground. Any unbalance in this distributed capacitance tends to shift the effective ground point for the signal applied to inductance 24 from oscillator 36 to one side of the inductance 24 so that the diodes 25 and 26 conduct unequally.

Figure 3:
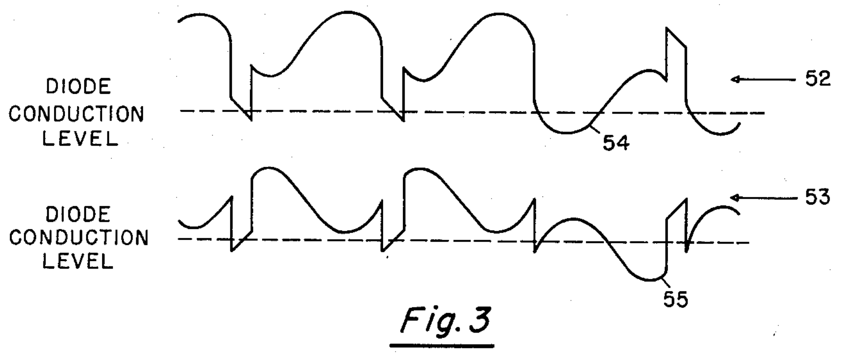

In order to show the difference in performance of a receiver embodying my invention over receivers of the prior art there are shown wave forms 52 and 53 of Figure 3. These wave forms occur in a receiver of the prior art which does not contain the differentiating circuit 16, 17, and correspond to the wave forms 48 and 49 respectively. It may be seen that, during the time of the vertical synchronizing pulses, conduction of the diodes occurs at the points 54 and 55 respectively. The amount of this conduction unfortunately is not controlled by the relative phases of the local oscillator and the incoming signal so that during this time an undesired "correcting" signal is formed at the plate of the diode 25. This incorrect voltage is transmitted to the frequency control and the oscillator responds. At the end of the vertical retrace time the phasing of the local oscillator is incorrect.

Figure 5:
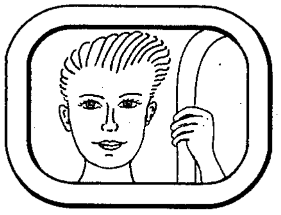
Figures 5 and 6 illustrate the improvement in a received television picture made possible by the use of the invention.
Figure 6:
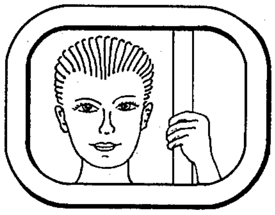

While te faulty phasing is corrected during the following frame, the top of the picture, which is generated during the "correcting" period, remains displaced laterally, as shown in Figure 5. By way of comparison the undistorted picture of Figure 6 is shown. The picture of Figure 6 is that which is obtained from a receiver embodying the invention under conditions which would produce in a prior art receiver the distortion shown in Figure 5.

Figure 4:
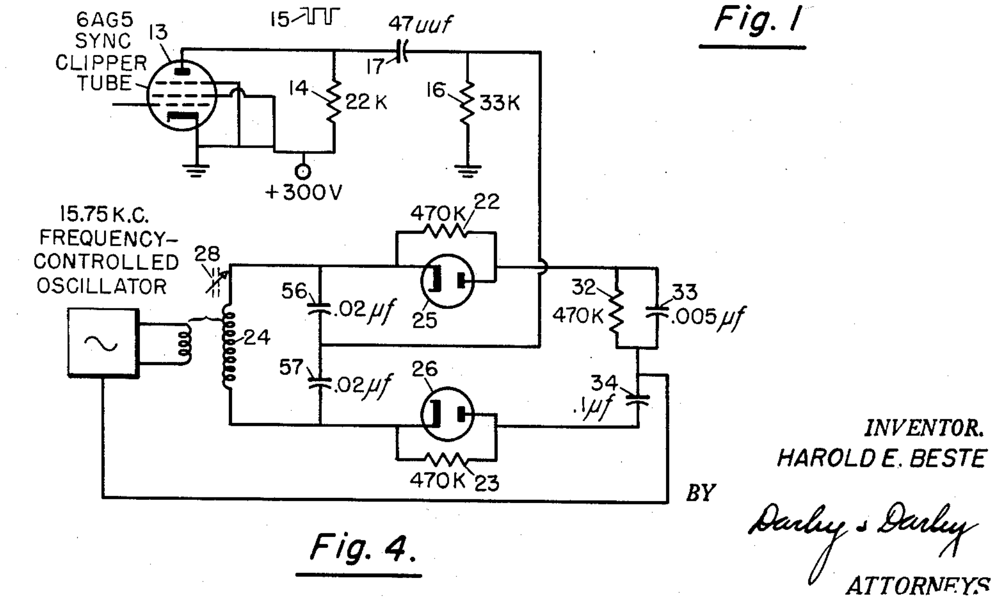
Figure 4 is a modified embodiment.

In Figure 4 is shown a second embodiment of the invention. This modification is similar to that of Figure 1 but has the differentiating circuit connected to the midpoint of two equal capacitors 56 and 57 connected in series to provide tuning capacitance for the inductance of the winding 24. Also, the resistors 22 and 23 are connected to the terminals of the inductance 24. The operation of this embodiment is similar to that described above.

In another embodiment, a different type of controlling reactance can be used, in which type a positive control voltage causes a decrease of frequency in the deflection oscillator. In this embodiment the device would stabilize with the sine waves approximately 180° out of phase with the condition shown above. In the new equilibrium condition, the device would be stable and operable.

Although specific embodiments have been shown and described, the scope of the invention will be defined in the following claims.

What is claimed is:

1. An automatic frequency control circuit comprising an oscillator, the frequency of which is to be controlled; a balanced discriminator connected to said oscillator to be energized thereby, said discriminator comprising a pair of diodes; a source of television synchronizing signals consisting of relatively short synchronizing pulses recurring at horizontal repetition rate and relatively long serrated synchronizing pulses recurring at vertical repetition rate whereby the direct current level of said synchronizing pulses during the horizontal synchronizing pulses is different from the direct current level during the serrated pulses; a differentiating circuit having an input connected to an output of said source of synchronizing signals to be energized thereby and having an output circuit connected to a balanced point in said discriminator so as to apply the output signal of said differentiating circuit equally to said diodes, said differentiating circuit having a time constant which is short in comparison to said horizontal synchronizing pulses substantially to eliminate the difference in direct current level between the serrated pulses and the horizontal synchronizing pulses; a frequency control tube having an input connected to the output of said discriminator to be energized thereby and an output connected to said oscillator to control the frequency thereof.

2. The automatic frequency control circuit of claim 1 in which said discriminator comprises a center-tapped inductance having end terminals connected to corresponding electrodes of said diodes, the center tap of said inductance comprising the balanced point in said discriminator.

3. The automatic frequency control circuit of claim 1 in which said discriminator comprises a pair of equal condensers, one terminal of each of said condensers being connected to a corresponding electrode of said diodes and the remaining terminal of each of said condensers being connected together to form the balanced point of said discriminator.

4. The automatic frequency control circuit of claim 1 in which said discriminator comprises a pair of relatively high impedance load resistors, each having one terminal connected to corresponding electrodes of said diodes, and in which said output circuit of said differentiating circuit has an impedance that is relatively low with respect to the impedance of said load resistors.

5. The automatic frequency control circuit of claim 4 in which the remaining terminals of each of said load resistors are connected together to said balanced point.

6. The automatic frequency control circuit according to claim 4 in which said load resistors are connected in parallel with said diodes.

References Cited in the file of this patent

UNITED STATES PATENTS

| | | |
|---|---|---|
| 2,332,681 | Wendt | Oct. 26, 1943 |
| 2,339,536 | Wendt | Jan. 18, 1944 |
| 2,344,810 | Fredendall et al. | Mar. 21, 1944 |
| 2,431,037 | Grundmann | Nov. 18, 1947 |
| 2,458,156 | Fredendall | Jan. 4, 1949 |
| 2,495,023 | Sebring et al. | Jan. 17, 1950 |
| 2,510,095 | Frankel | June 6, 1950 |
| 2,598,370 | Gruen | May 27, 1952 |
| 2,602,896 | Whitaker | July 8, 1952 |